(12) United States Patent
Lamberti et al.

(10) Patent No.: US 11,513,078 B2
(45) Date of Patent: Nov. 29, 2022

(54) COATED FIBER OPTIC CHEMICAL AND RADIATION SENSORS

(71) Applicants: Consolidated Nuclear Security, LLC, Oak Ridge, TN (US); The University of Tennessee Research Foundation, Knoxville, TN (US)

(72) Inventors: Vincent E. Lamberti, Oak Ridge, TN (US); Dayakar Penumadu, Knoxville, TN (US)

(73) Assignees: Consolidated Nuclear Security, LLC, Oak Ridge, TN (US); The University of Tennessee Research Foundation, Knoxville, TN (US)

(*) Notice: Subject to any disclaimer, the term of this patent is extended or adjusted under 35 U.S.C. 154(b) by 8 days.

(21) Appl. No.: 17/086,782

(22) Filed: Nov. 2, 2020

(65) Prior Publication Data
US 2022/0107273 A1  Apr. 7, 2022

Related U.S. Application Data (63) Continuation-in-part of application No. 17/060,253, filed on Oct. 1, 2020.

(51) Int. Cl.
*G01N 21/77* (2006.01)
*G01D 5/353* (2006.01)
(Continued)

(52) U.S. Cl.
CPC ..... *G01N 21/7703* (2013.01); *G01D 5/35361* (2013.01); *G01M 3/047* (2013.01); *G01M 11/088* (2013.01); *G01T 1/201* (2013.01); *G02B 6/02104* (2013.01); *G01N 2021/7709* (2013.01); *G01N 2021/7716* (2013.01); *G01N 2021/7723* (2013.01)

(58) Field of Classification Search
None
See application file for complete search history.

(56) References Cited

U.S. PATENT DOCUMENTS

| | | |
|---|---|---|
| 4,125,644 A | 11/1978 | Ketley et al. |
| 4,994,668 A | 2/1991 | Lagakos et al. |
| (Continued) | | |

FOREIGN PATENT DOCUMENTS

| | | | |
|---|---|---|---|
| EP | 2977750 A1 * | 1/2016 | ........... G01N 21/774 |
| ES | 2480190 T3 | 7/2014 | |
| (Continued) | | | |

OTHER PUBLICATIONS

Spirin et al. ("Fiber Bragg grating sensor for petroleum hydrocarbon leak detection", Optics and Lasers in Engineering 32 (2000) 497-503). (Year: 2000).*

(Continued)

*Primary Examiner* — Michelle R Connelly
(74) *Attorney, Agent, or Firm* — Clements Bernard Walker; Christopher L. Bernard (57) ABSTRACT

Distributed fiber optic sensors formed by covering the fibers with tubing are provided. The tubing including responsive materials formulated or configured to, responsive to exposure to one of a target chemical species and a target radiation particle, change a relative size and generate a localized effect on or in the optical fiber.

18 Claims, 8 Drawing Sheets

(51) Int. Cl.
*G01M 3/04* (2006.01)
*G01M 11/08* (2006.01)
*G01T 1/20* (2006.01)
*G02B 6/02* (2006.01)

(56) References Cited

U.S. PATENT DOCUMENTS

| | | | |
|---|---|---|---|
| 5,864,641 A | 1/1999 | Murphy et al. | |
| 6,102,617 A | 8/2000 | Hampton | |
| 6,701,776 B2 | 3/2004 | Stetter | |
| 7,051,577 B2 | 5/2006 | Komninos | |
| 7,651,862 B2* | 1/2010 | Ponce | G01M 3/047 436/164 |
| 8,203,707 B2* | 6/2012 | Xu | G01F 23/292 356/301 |
| 8,640,527 B2* | 2/2014 | Hara | G01M 3/047 73/52 |

FOREIGN PATENT DOCUMENTS

| | | | |
|---|---|---|---|
| KR | 101067140 B1 | 9/2011 | |
| WO | 2004108620 A2 | 12/2004 | |
| WO | WO-2020170047 A1 * | 8/2020 | ............. G01M 3/04 |

OTHER PUBLICATIONS

Lu et al. ("A Review of Methods for Fibre-Optic Distributed Chemical Sensing", Sensors 2019 19, 2876, 20 pages) (Year: 2019).*
Cong et al., "Fiber optic Bragg grating sensor based on hydrogels for measuring salinity", Sensors and Actuators B 87 (2002) 487-490) (Year: 2002).*
Kamel Cherif, "Detection of aromatic hydrocarbons in air and water by using xerogel layers coated on PCS fibers excited by an inclined collimated beam", Article, Science Direct, Sensors and Actuators B 95 (2003) 97-106.
K. Toh, "Radiation-resistantopticalfiber/scintillatorsystemforgamma-raymonitor", Journal, SciVerse Science Direct, Nuclear InstrumentsandMethodsinPhysicsResearchA700(2013)130-134.
R. Naka, "Radiation Distribution Sensing With Normal Optical Fiber", Article, IEEE Transactions On Nuclear Science, vol. 48, No. 6, Dec. 2001.
H. Henschel et al., "Radiation-induced loss of Rare Earth doped silica fibres", Article, IEEE Transactions On Nuclear Science, vol. 45, No. 3, Jun. 1998.
H. Henschel et al., "Fibre Optical Radiation Sensing System for Tesla", Proceedings DIPAC 2001—ESRF, Grenoble, France, pp. 73-75.
R. Karime et al.,"Optical Sensor for Sulfur Dioxide Determination in Wines", Journal, J. Agric. Food Chem. 2006, 54, 8697-8701.

* cited by examiner

COATED FIBER OPTIC CHEMICAL AND RADIATION SENSORS

CROSS-REFERENCE TO RELATED APPLICATION(S)

The present disclosure is a continuation-in-part (CIP) of co-pending U.S. patent application Ser. No. 17/060,253 entitled "COATED FIBER OPTIC CHEMICAL AND RADIATION SENSORS," filed on Oct. 1, 2020, the contents of which are incorporated in full by reference herein.

STATEMENT REGARDING GOVERNMENT RIGHTS

The U.S. Government has certain rights to the present disclosure pursuant to Contract No. DE-NA0001942 between the U.S. Department of Energy and Consolidated Nuclear Security, LLC.

TECHNICAL FIELD

The present disclosure relates generally to the fiber optic and chemical and radiation sensor fields. More particularly, the present disclosure relates to coated fiber optic chemical and radiation sensors.

BACKGROUND

As light is transmitted along an optical fiber, it is attenuated by random microscopic fluctuations in the refractive index of the fiber core, a process known as Rayleigh backscattering. The Rayleigh scattering "signature" is intrinsic to the optical material and can be used to turn the fiber into a distributed sensor. The first, and still most popular, method for realizing this is optical time-domain reflectometry (OTDR). In OTDR, a baseline is established by injecting a series of optical pulses into the fiber and measuring the magnitude of backscattered light as a function of time. Since it is possible to calculate the speed of a pulse in the fiber from the index of refraction of the glass or plastic in the core, the OTDR can correlate the amount of backscattered light received at a certain time with a location along the length of the fiber. In effect, OTDR is optical radar. Any localized stimulus that changes the index of refraction of the fiber, like a mechanical or thermal insult, or causes attenuation (i.e., loss) of the optical pulse, can be associated with a specific position. In current commercial instruments, this determination can be made in fibers extending to a hundred kilometers, with a position resolution on the order of 1 m.

A number of other techniques for spatially-resolved reflectometry have been developed that provide improvements to OTDR in sensitivity, dynamic range, or positional resolution, including coherent OTDR, pseudorandom coded OTDR, optical frequency-domain reflectometry (OFDR), and coherent OFDR. One company offers a series of instruments based on optical backscatter reflectometry (OBR), a polarization-diverse variation of OFDR, which can achieve a spatial resolution of 1 mm over a fiber length of 2 km or a resolution of 20 μm over a length of 70 m.

Fiber optic sensors are employed for distributed measurements of temperature and mechanical strain, and they have been applied to profile temperature in electrical power and fire detection systems; to monitor stress in bridges and dams; and to provide real-time indications of temperature, stress, and vibration in aerospace components. In addition, they have been adapted to measure pressure, fluid level, flow rate, position, electrical current and voltage, chemical concentration, and radiation dose. Fiber optic sensors have been run along pipelines to detect leakages of liquids or high-pressures gases, as an alternative to visual inspection or mass/volume balance calculations. The leakages occur because of ground movements due to, for example, seabed erosion and permafrost thaw settlement, accidental penetrations, and even sabotage. The liquids typically are at temperatures higher than those of the materials surrounding the pipeline, so a leak would cause a local hot spot, whereas escape of a high-pressure gas would lead to local cooling through the Joule-Thomson effect.

Fiber optic chemical sensors generally are classified as extrinsic or intrinsic. In an extrinsic device, the fiber is used simply as a means to convey light to and from a point detector mounted on the end of the fiber. In contrast, in an intrinsic device, the fiber itself is part of the sensing mechanism. Typically, sections of the cladding are removed and the stripped portions are coated with a material whose optical properties (absorbance, reflectance, fluorescence, or light polarization) change in the presence of a target; these changes in turn affect the intensity, spectral composition, or other features of the light transmitted by the fiber. Intrinsic fiber optic sensors have been applied to detect some of the aromatic components of petroleum in air and water.

Optical fibers have been mounted to scintillators for point detection of radiation, and they have been used for distributed radiation detection. An OTDR-based system installed on the Teraelectronvolt Energy Superconducting Linear Accelerator (TESLA) at DESY Hamburg has been described. It has been found that one long fiber could cover up to several kilometers of an accelerator beamline and measure on-line doses with a detection limit of a few Gy and a resolution of several meters. In addition, it has been demonstrated that optical fibers could be used as radiation dosimeters. Using plastic fiber and the time-of-flight (TOF) measurement technique, a distributed radiation sensor has been built that is sensitive to beta particles ($^{90}Sr \rightarrow ^{90}Y + \beta -$), gamma rays ($^{137}Cs$), and fast (D-T) neutrons, with spatial resolutions of 30, 37, and 13 cm, respectively. Similarly, a TOF-based distributed sensor has been developed for fast neutrons (1-2 MeV peak energy) that has a resolution of about 60 cm over a fiber length of 100 m.

For fiber optic radiation sensors, it is known that various dopants, either singly or in combination, can enhance reflection loss. For example, it has been reported that fibers doped with $Nd^{3+}$ are highly sensitive to gamma rays and thermal neutrons, with the loss increasing with rare-earth concentration, and it has been suggested that the concentrations of co-dopants like Ge and Al often control the extent of loss. (Thermal neutrons have energy in the vicinity of 0.025 eV.) The loss from $^{60}Co$ irradiation in 18 fibers doped with different concentrations of rare earths and other elements has been compared, and it has been concluded that the amount of Al exerted the greatest influence.

SUMMARY

The present disclosure provides distributed fiber optic sensors formed by at least one of coating the fibers with certain types of response materials and covering the fibers with a tubing including certain types of response materials. For distributed chemical sensors, the coatings are reactive with the targets; the heat absorbed or released during a reaction will cause a local temperature change on the fiber. For distributed radiation sensors, coating a fiber with a scintillator enhances sensitivity toward thermal neutrons, for example, by injecting light into the fiber. The luminescent components in these materials are taken from conjugated polymeric and oligomeric dyes, metal organic frameworks with sorbed dyes, and two-photon-absorbing semiconductors. The compositions may exhibit strong gamma rejection. Other scintillators combining luminescent materials with neutron converters are available. With a multiple-layer coating, it may be possible to identify the presence of both neutrons and gamma rays, for example. For distributed fiber optic sensors formed with the tubing, the tubing responds to exposure to one of a target material and a target radiation by changing a radial size thereof, which generates a localized effect on or in the fiber. Herein, "distributed" refers to different remote regions all having a "sensing" capability, such that a chemical or radiation exposure or insult can be detected and localized.

In one illustrative embodiment, the present disclosure provides a distributed fiber optic sensor device, including: an optical fiber; and one or more of a reactive coating and a responsive coating disposed adjacent to a surface of the optical fiber, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber. The distributed fiber optic sensor device further includes a detection device coupled to the optical fiber operable for detecting and localizing one or more of the localized thermal effect generated by the reactive coating on or in the optical fiber and the localized thermal or photonic effect generated by the responsive coating on or in the optical fiber. Optionally, when used, the reactive coating includes a material that is reactive to a constituent of petroleum. Optionally, when used, the responsive coating includes one or more of a $^6$LiF-containing scintillator sensitive to thermal neutrons and another scintillator combining a luminescent material with a neutron converter.

In another illustrative embodiment, the present disclosure provides a distributed fiber optic sensor method, including: providing an optical fiber; and disposing one or more of a reactive coating and a responsive coating adjacent to a surface of the optical fiber, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber. The distributed fiber optic sensor method further includes coupling a detection device to the optical fiber operable for detecting and localizing one or more of the localized thermal effect generated by the reactive coating on or in the optical fiber and the localized thermal or photonic effect generated by the responsive coating on or in the optical fiber. Optionally, when used, the reactive coating includes a material that is reactive to a constituent of petroleum. Optionally, when used, the responsive coating includes one or more of a $^6$LiF-containing scintillator sensitive to thermal neutrons and another scintillator combining a luminescent material with a neutron converter.

In a further illustrative embodiment, the present disclosure provides a distributed fiber optic sensor device, including: an optical fiber; and tubing disposed adjacent to a surface of the optical fiber, wherein, when used, the tubing is formulated or configured to, responsive to exposure to one of a target chemical species and a target radiation particle, change in a radial size and generate a localized effect on or in the optical fiber due to the change in the radial size. The distributed fiber optic sensor device further includes a detection device coupled to the optical fiber operable for detecting and localizing one or more of the localized effect generated by the tubing on or in the optical fiber. Optionally, the distributed fiber optic sensor device further includes one or more of a reactive coating and a responsive coating disposed adjacent to a surface of one of the optical fiber and the tubing, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber.

In yet another illustrative embodiment, the present disclosure provides a distributed fiber optic sensor method, including: providing an optical fiber; and disposing tubing adjacent to a surface of the optical fiber, wherein, when used, the tubing is formulated or configured to, responsive to exposure to one of a target chemical species and a target radiation particle, change in a radial size and generate a localized effect on or in the optical fiber due to the change in the radial size. The distributed fiber optic sensor method further includes coupling a detection device to the optical fiber operable for detecting and localizing one or more of the localized effect generated by the tubing on or in the optical fiber. Optionally, the distributed fiber optic sensor method further includes disposing one or more of a reactive coating and a responsive coating adjacent to a surface of one of the optical fiber and the tubing, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber.

BRIEF DESCRIPTION OF THE DRAWINGS

The present disclosure is illustrated and described herein with reference to the various drawings, in which like reference numbers are used to denote like system components/ method steps, as appropriate, and in which.

DESCRIPTION OF EMBODIMENTS

The present disclosure provides distributed fiber optic sensors formed by one or more of coating the fibers with certain types of response materials and covering the fibers with a tubing that includes certain types of responsive materials. For distributed chemical sensors, the coatings are reactive with the targets; the heat absorbed or released during a reaction will cause a local temperature change on the fiber. The magnitude of the temperature change need not be very large—with one illustrative OBR device having a temperature resolution of ±0.1° C. over a length of 70 m. The coatings can be designed to be responsive toward large classes of chemicals or specific types of molecules. For instance, as discussed below, one very promising application is detection of petroleum leaks from underground storage tanks that are at the same temperature as the surrounding soil, both tank and/or contents. Petroleum is a complex mixture of aliphatic and aromatic hydrocarbons; other organic compounds containing nitrogen, oxygen, and sulfur; and trace metals. In general, aromatic compounds undergo electrophilic substitution, in which an atom in an aromatic system is replaced by an electrophile (i.e., an electron pair acceptor); some possibilities are nitration, halogenation, sulfonation, and acylation. More specifically, molecularly-imprinted polymer (MIP) coatings have been developed that are sensitive toward benzene, toluene, and o-, m-, and p-xylene. (An MIP is synthesized by performing the polymerization reaction in the presence of a molecular template, which induces the creation of recognition sites within the polymer network that are complementary to the template.) The coatings are prepared via copolymerization of styrene, divinylbenzene, and tung oil with 1,2,3-trimethoxybenzene as a template, and are used to enhance the performance of sensors based on quartz crystal microbalances (QCM), for example. The coatings are reusable after complete removal of the targets through washing with a solvent, such as ethanol, an important feature for storage tank monitoring, since the fiber—perhaps kilometers in length—does not have to be replaced after a single exposure. A number of other coatings are available that are combined with QCM sensors to detect organic gases and liquids, heavy metal ions, water vapor, and proteins.

For distributed radiation sensors, coating a fiber with one of the flexible $^6$LiF-containing scintillators that has been developed enhances sensitivity toward thermal neutrons by injecting light into the fiber. The luminescent components in these materials are taken from conjugated polymeric and oligomeric dyes, metal organic frameworks with sorbed dyes, and two-photon-absorbing semiconductors. The compositions exhibit strong gamma rejection. Other scintillators combining luminescent materials with neutron converters are available. For example, $ZnS(Ag)/^6LiF$ and $ZnS(Ag)/^{10}B_2O_3$ powders have been synthesized with thermal neutron detection efficiencies of 44 and 30%, respectively. With a multiple-layer coating, it may be possible to identify the presence of both neutrons and gamma rays, for example.

For distributed fiber optic sensors formed with the tubing, the tubing responds to exposure to one of a target chemical and a target radiation by changing a radial size thereof, which generates a localized effect on or in the fiber. In particular, the responsive material of the tubing, upon exposure to the target chemical or target radiation, constricts or expands in a radial direction of the tubing. The constriction or expansion of the tubing around the fiber affects the light transmitted therethrough, which effect can be detected signifying the presence of the target chemical/radiation.

Figure 1:
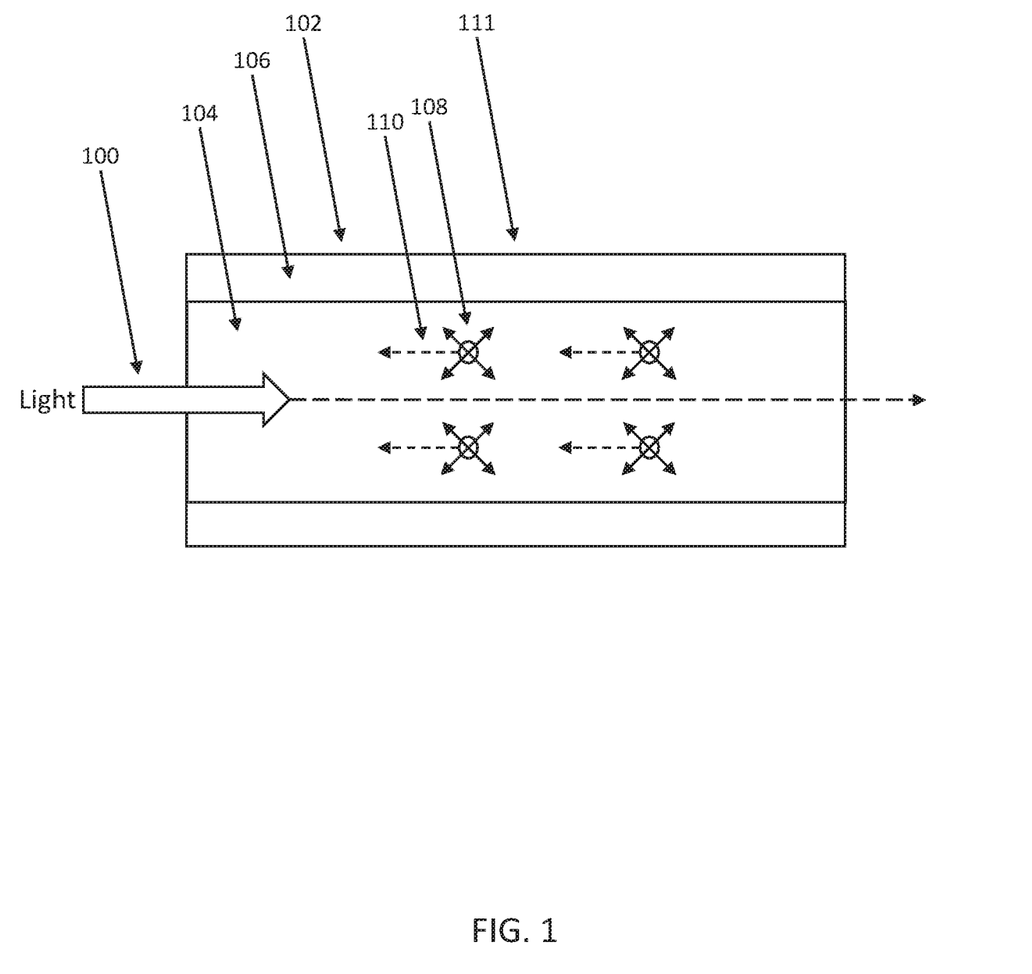
FIG. 1 is a schematic diagram illustrating the Rayleigh backscattering principles utilized by the distributed fiber optic chemical and radiation sensors of the present disclosure.

FIG. 1 is a schematic diagram illustrating the Rayleigh backscattering principles utilized by the distributed fiber optic chemical and radiation sensors of the present disclosure. Here, light 100 is transmitted through an optical fiber 102, which may consist of a core 104 and cladding 106, as is well known to those of ordinary skill in the art. The transmitted light 100 results in Rayleigh scattered light 108 due to minute fluctuations in the refractive index of the core 104. This Rayleigh scattered light 108 generates reflected Rayleigh backscattered light 110 that may be captured and analyzed to determine the location and magnitude of disturbances along the optical fiber 102. OTDR and other "optical ranging" techniques may be used to determine position via the speed of light and knowledge of the refractive index of the core 104. Such distributed fiber optic sensors 111 are often used for performing distributed measurements of temperature and mechanical strain, both of which cause localized Rayleigh backscattering 110 in the optical fiber 102. For example, a distributed fiber optic sensor 111 can be used to detect leakages in underground storage tanks (USTs) or pipelines, as transported liquids are typically at higher temperatures than the surrounding soil and the leakage of transported high-pressure gases leads to localized Joule-Thomson cooling. Again, an illustrative OBR device has a resolution of ~1 mm over a fiber length of 2 km (<10 s scan time). Other illustrative applications include assessing temperature profiles in electrical power and fire detection systems, monitoring stresses in bridges and dams, and measuring vibrations in aerospace components. In the present disclosure, the Rayleigh backscattering 110 is used to detect chemical and radiation insults that are detected by the distributed fiber optic sensor 111 as temperature or scintillation events, with the provided ability to identify and distinguish insult targets, while providing manufacturing simplicity that makes large-scale deployments feasible. Such distributed fiber optic sensors 111 can be discriminated and bundled to further cover a spectrum of potential insults.

Figure 2:
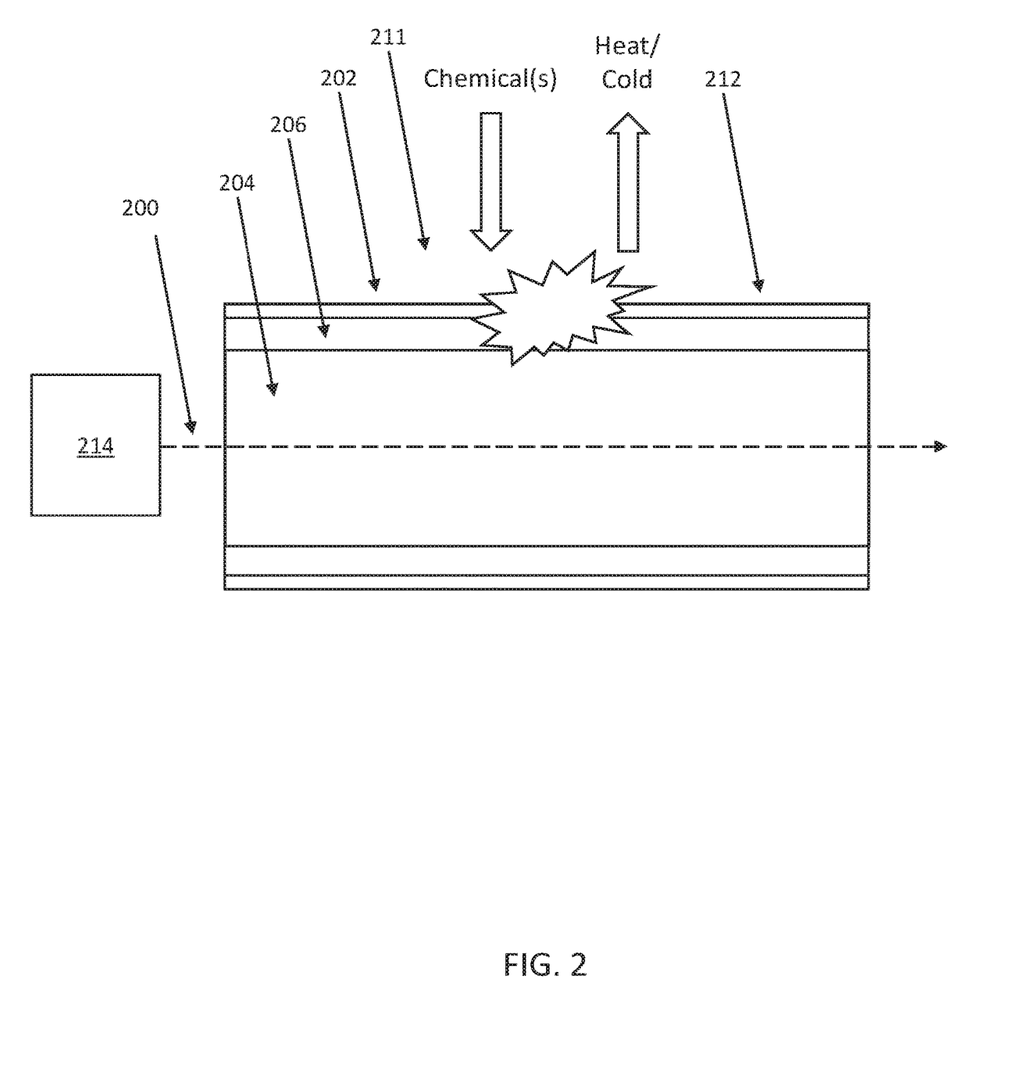
FIG. 2 is a schematic diagram illustrating one illustrative embodiment of the distributed fiber optic chemical sensor of the present disclosure.

FIG. 2 is a schematic diagram illustrating one illustrative embodiment of the distributed fiber optic chemical sensor 211 of the present disclosure. Again, the distributed fiber optic chemical sensor 211 includes an optical fiber 202 consisting of a core 204 and optionally a cladding 206, as is well known to those of ordinary skill in the art. The core 204 defines a light path 200. Here, the optical fiber 202 is coated with a reactive coating 212 (or surrounded by a reactive layer) that is constituted/configured to react with a chemical to which the distributed fiber optic chemical sensor 211 is exposed, reacting endothermically or exothermically with the specific chemical target(s). Heat absorbed or released by the reactive coating 212 causes a local temperature change on the optical fiber 202. The detection device 214 coupled to the optical fiber 202 may have a resolution of ±0.1° C., for example. The coating(s) 212 may be in contact with the optical fiber 202, or may surround the optical fiber 202 at a distance, provided that they form a separate structure that is distinguishable from the optical fiber 202, as opposed to a doped optical fiber 202 or the like. Again, different distributed optical fiber chemical sensors 211 can be bundled to detect multiple chemical species and, as described in greater detail herein below, layered or hybrid coatings may be used.

Since there is an enormous range of potential chemical targets, one illustrative coating application is considered here—the detection of petroleum leaks from underground storage tanks that are at the same temperature as the surrounding soil, both tank and/or contents. Petroleum is a complex mixture of aliphatic and aromatic hydrocarbons; other organic compounds containing nitrogen, oxygen, and sulfur; and trace metals. In general, aromatic compounds undergo electrophilic substitution, in which an atom in an aromatic system is replaced by an electrophile (i.e., an electron pair acceptor); some possibilities are nitration, halogenation, sulfonation, and acylation. In addition, molecularly-imprinted polymer (MIP) coatings have been developed that are sensitive toward benzene, toluene, and o-, m-, and p-xylene. (An MIP is synthesized by performing the polymerization reaction in the presence of a molecular template, which induces the creation of recognition sites within the polymer network that are complementary to the template.) The coatings are prepared via copolymerization of styrene, divinylbenzene, and tung oil with 1,2,3-trimethoxybenzene as a template, and are used to fabricate sensors based on quartz crystal microbalances (QCMs). The coatings are reusable after complete removal of the targets through washing with a solvent, such as ethanol, an important feature for storage tank monitoring since the fiber—perhaps kilometers in length—would not have to be replaced after a single exposure. Additional examples of response materials might include other QCM sensor coatings: polyaniline-$TiO_2$ nanocomposites and $CeO_2$/ZnO nanofibrous mats for organic gases; copolymers of 2-mercaptobenzothiazole derivatives and N-vinyl imidazole for heavy metal ions; poly(methylmethacrylate) for water; and 1-butyl-3-methylimidazolium tetrafluoroborate for acetone.

Figure 3:
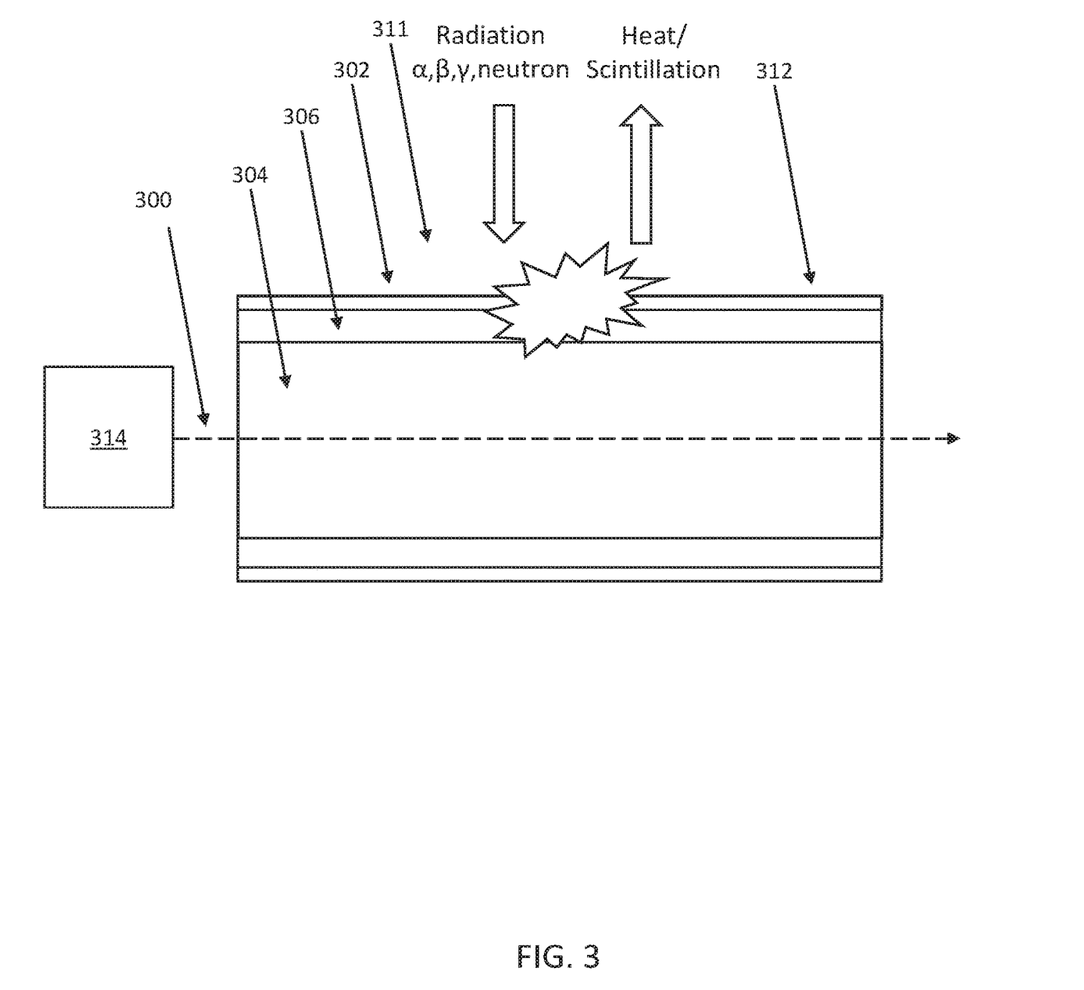
FIG. 3 is a schematic diagram illustrating one illustrative embodiment of the distributed fiber optic radiation sensor of the present disclosure.

FIG. 3 is a schematic diagram illustrating one illustrative embodiment of the distributed fiber optic radiation sensor 311 of the present disclosure. Again, the distributed fiber optic radiation sensor 311 includes an optical fiber 302 consisting of a core 304 and optionally a cladding 306, as is well known to those of ordinary skill in the art. The core 304 defines a light path 300. Here, the optical fiber 302 is coated with a responsive coating 312 (or surrounded by a responsive layer) that is constituted/configured to respond to radiation ($\alpha$, $\beta$, $\gamma$, or neutron) to which the distributed fiber optic radiation sensor 311 is exposed, heating and/or scintillating and injecting photons into the optical fiber 302. The detection device 314 senses and localizes this heating or these photons based on changes in signal loss along the optical fiber 302. Illustrative coatings that can be used to detect radiation include, but are not limited to, $^6$LiF-containing scintillators sensitive to thermal neutrons, for example. The coatings may be in contact with the optical fiber 302 or may surround the optical fiber 302 at a distance, provided that they form a separate structure that is distinguishable from the optical fiber 302, as opposed to a doped optical fiber 302 or the like. Again, different distributed optical fiber radiation sensors 311 can be bundled to detect multiple particles and, as described in greater detail herein below, layered or hybrid coatings may be used.

For heat generation, a variety of materials might be used for each of the four radiation targets. One fundamental question for each possibility is whether a reasonable coating thickness will slow or stop enough particles to generate a sufficient temperature change for detection by the sensor electronics. Alpha particles (e.g., helium nuclei) are absorbed by most materials, including thin paper. Beta particles (e.g., electrons or positrons) are stopped by millimeter-scale metals and plastics. Gamma photons have much greater penetrating power than alpha or beta particles and are most effectively stopped by materials with very high density, such as metals with large atomic numbers (gold, lead, etc.); as the energy of the radiation increases, thicker shields are required. Finally, neutrons readily travel through most materials but are slowed by light nuclei, so neutron shields are commonly fabricated from compounds with high hydrogen contents, such as polyethylene, polystyrene, polyurethane, and silicone. The efficiency of these materials can be improved by incorporating other elements with high neutron cross-sections, such as lithium, boron, and gadolinium; examples include borated polyethylene and borated silicone. Similarly, many different scintillators are available for the radiation targets. These compounds ideally would be embedded in flexible and transparent fiber coatings. The most popular scintillator for heavy ions like alpha particles is ZnS(Ag); that is, ZnS activated with a few ppm of Ag. (ZnS emits in the far blue and near ultraviolet regions; doping with Ag shifts the output toward the middle-blue spectrum.) Other possibilities are CsI(Tl), $CaF_2$(Eu), and Ce-doped $Gd_2Si_2O_7$ (GPS). For beta particles, solid polymer matrices loaded with inorganic scintillating crystals, the composites known simply as plastic scintillators, are commonly used. For gamma photons, scintillators containing high-atomic-number components provide the best performance, the most widely used compounds being NaI(Tl) and $Bi_4Ge_3O_{12}$ (BGO). Many studies of novel gamma scintillators have been reported; for instance, a series of Ce-doped crystals with the elpasolite ($K_2NaAlF_6$) structure were evaluated, with $Cs_2LiLaCl_6$(Ce) displaying the greatest light output and $Cs_2LiYBr_6$(Ce) exhibiting both exceptional energy resolution and high light output. As discussed, coating a fiber with a flexible $^6$LiF-containing scintillator provides sensitivity toward thermal neutrons. The luminescent components in these materials are taken from conjugated polymeric and oligomeric dyes, metal organic framework dyes, and two-photon-absorbing semiconductors. Other thermal neutron scintillators combining luminescent materials with neutron converters are available, such as ZnS(Ag)/$^6$LiF and ZnS(Ag)/$^{10}B_2O_3$ powders. For fast neutrons, organic phosphors such as stilbene and anthracene might be employed. Some scintillators respond to multiple targets, and others exhibit selectivity. For example, $Gd_2SiO_5$ (GSO) doped with 1.5 mol. % Ce detects beta particles, whereas the same compound doped with 0.4 mol. % Ce detects gamma photons. Some compositions exhibit strong gamma rejection, and it was recently demonstrated a plastic scintillator consisting of a poly(vinyl toluene) matrix loaded with 2,5-diphenyloxazole (PPO) discriminates between neutrons and gamma rays.

Figure 4:
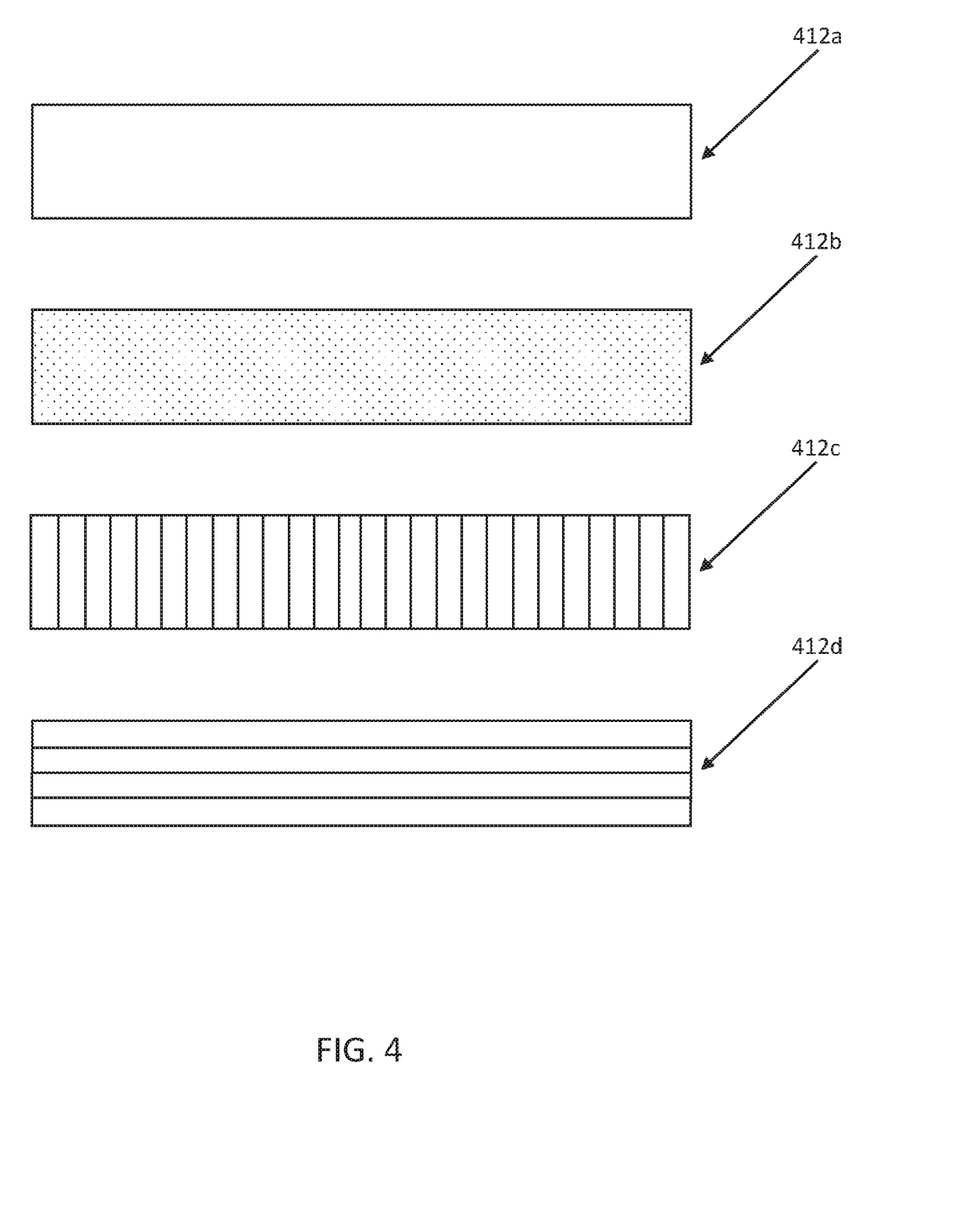
FIG. 4 is a schematic diagram illustrating various illustrative embodiments of the distributed fiber optic chemical and radiation sensors of the present disclosure, utilizing a variety of coating configurations.

FIG. 4 is a schematic diagram illustrating various illustrative embodiments of the distributed fiber optic chemical and radiation sensors 211 (FIG. 2) and 311 (FIG. 3) of the present disclosure, utilizing a variety of coating configurations. Here, the single reactive or responsive coating 412a, can be functionalized to react or respond to multiple species or particles via a coating including varied and dispersed coating elements or regions 412b, a coating including varied and horizontally adjacent coating elements or regions 412c, or a coating including varied and vertically adjacent coating elements or layers 412d. The coating elements or layers 412d could be stacked, meaning that two or more regions consisting of different reactive/responsive materials could be applied sequentially along the optical fiber 202 (FIG. 2) and 302 (FIG. 3).

Figure 5:
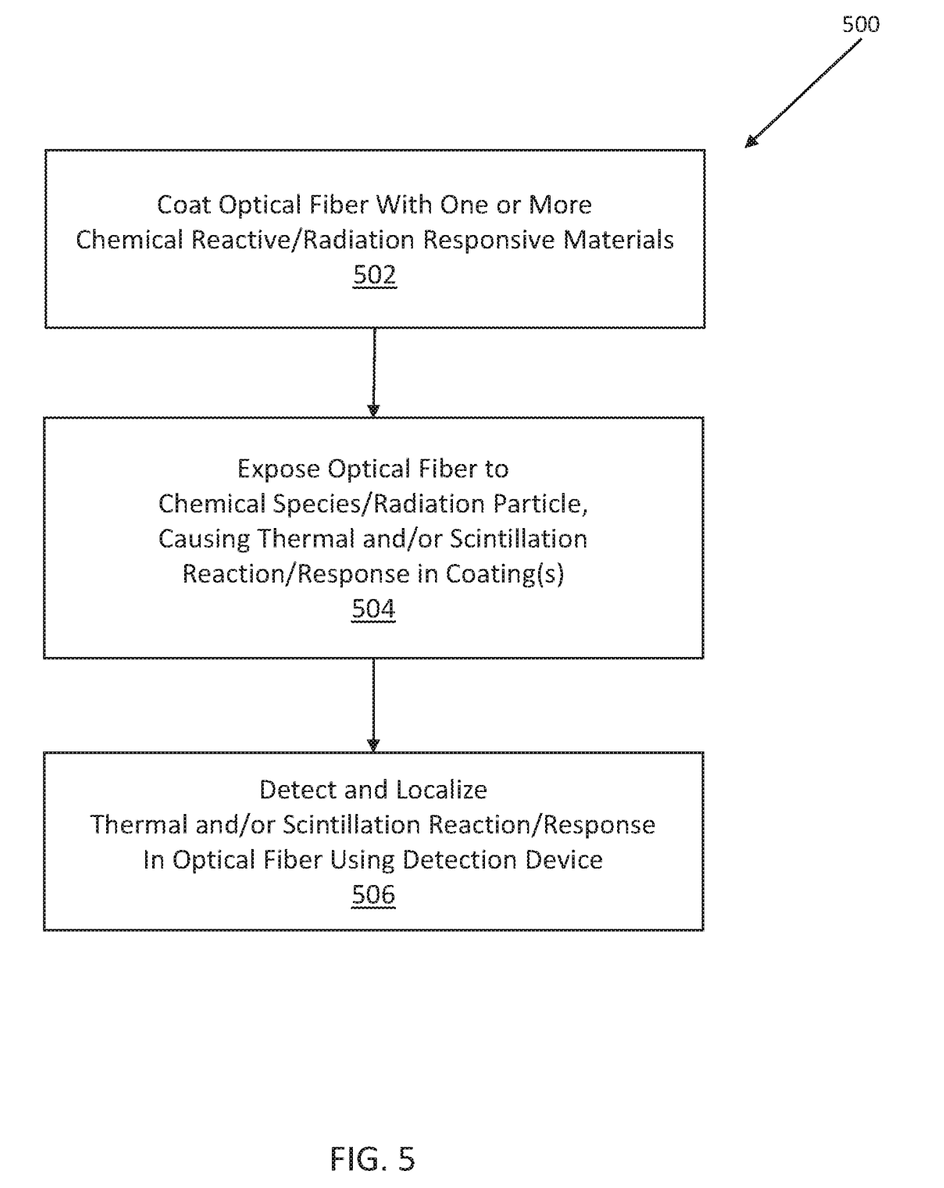
FIG. 5 is a flowchart illustrating one illustrative embodiment of the method for manufacturing and using the distributed fiber optic chemical and radiation sensors of the present disclosure.

FIG. 5 is a flowchart illustrating one illustrative embodiment of the method 500 for manufacturing and using the distributed fiber optic chemical and radiation sensors of the present disclosure. The method 500 includes, first coating the optical fiber with the one or more chemical reactive/radiation responsive materials 502. Next, the method 500 includes exposing the optical fiber to one or more chemical species/radiation particles, causing a thermal and/or scintillation reaction/response in the coating(s) 504. Finally, the method 500 includes detecting and localizing the thermal and/or scintillation reaction/response in the optical fiber using the detection device 506.

Figure 6:
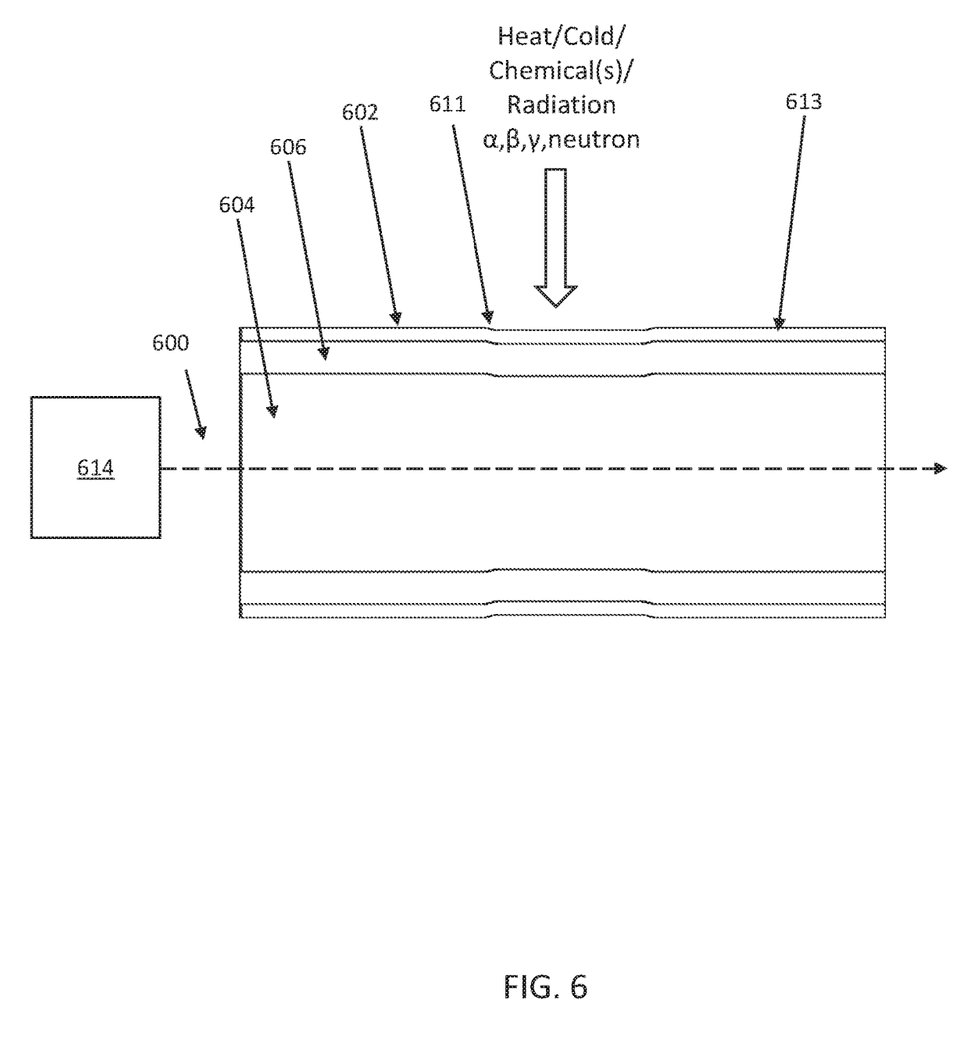
FIG. 6 is a schematic diagram illustrating another illustrative embodiment of the distributed fiber optic sensor of the present disclosure.

FIG. 6 is a schematic diagram illustrating another illustrative embodiment of the distributed fiber optic sensor 611 of the present disclosure. The distributed fiber optic sensor 611 includes an optical fiber 602 including a core 604 and a cladding 606, as is well known to those of ordinary skill in the art. The core 604 defines a light path 600. Here, the optical fiber 602 is covered, at least partially, with a tubing 613 that is constituted/configured to react with at least one of a chemical to which the distributed fiber optic sensor 611 is exposed, radiation ($\alpha$, $\beta$, $\gamma$, or neutron) to which the distributed fiber optic sensor 611 is exposed, and a temperature change to which the distributed fiber optic sensor 611 is exposed. In particular, the tubing 613 is adapted to change a radial size, such as by one of radially constricting and radially expanding based one of contact with a selected chemical, exposure to radiation ($\alpha$, $\beta$, $\gamma$, or neutron), and exposure to a select temperature change.

The detection device 614 coupled to the optical fiber 602 is configured to capture and analyze the Rayleigh scattered light to detect any changes thereto. In particular, the detection device 614 is configured to detect changes in the Rayleigh scattered light caused by the change in radial size of the tubing 613 to detect, for example, the chemical or the radiation causing the change in radial size of the tubing 613. The tubing 613 may be in direct or indirect contact with the optical fiber 602, and in some embodiments, is an outer layer of the optical fiber 602. Again, different distributed optical fiber sensors 611 can be bundled to detect multiple chemical species, radiation types, various temperature changes, and the like. Further, as previously described, layered or hybrid coatings may be used.

In embodiments, the response material that causes the change in radial size within the tubing 613 forms the tubing or is distributed within the tubing 613. In some embodiments, the response material is a polymer that expands or constricts based on one of exposure to the target chemical, exposure to the target radiation, and exposure to a predetermined temperature change, such as heat or cold shrink tubing.

Figure 7:
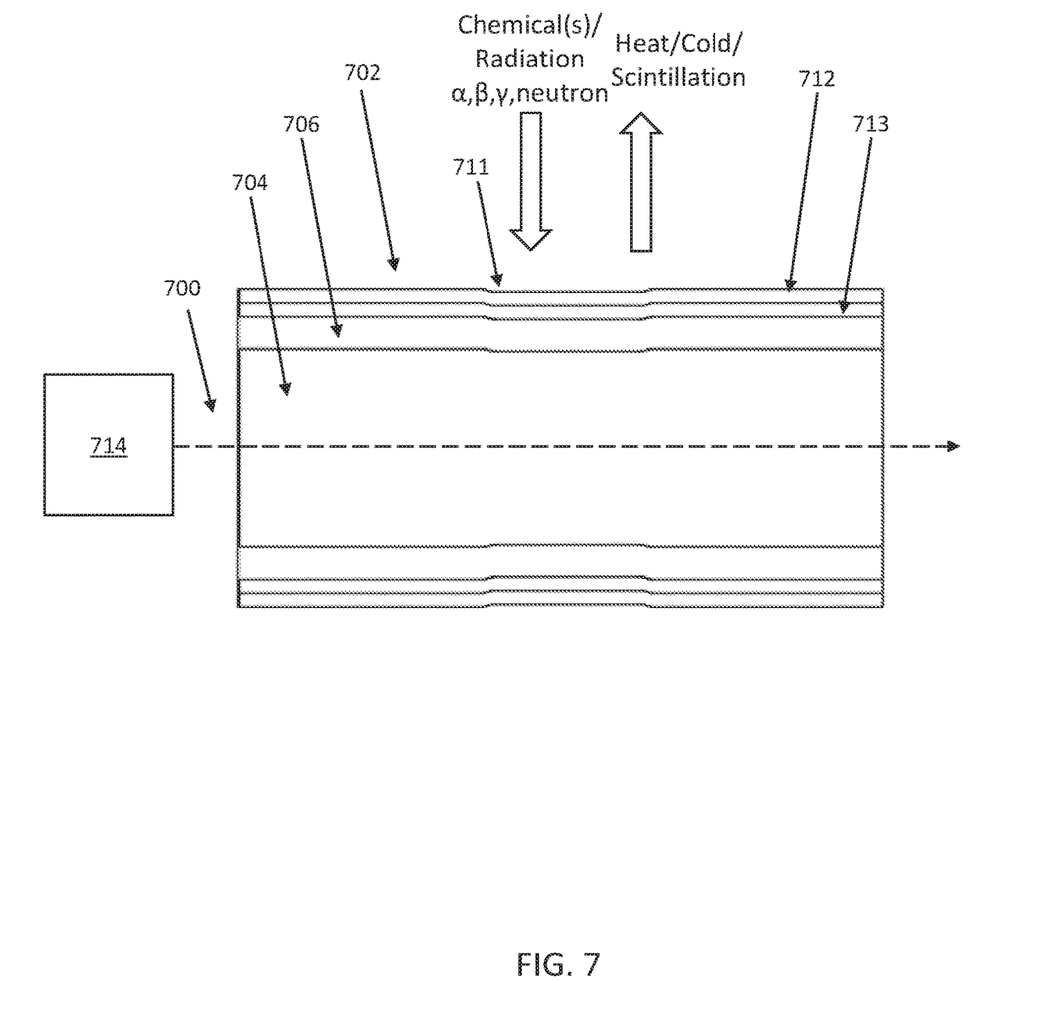
FIG. 7 is a schematic diagram illustrating a further illustrative embodiment of the distributed fiber optic sensor of the present disclosure.

FIG. 7 is a schematic diagram illustrating a further illustrative embodiment of the distributed fiber optic sensor 711 of the present disclosure. The distributed fiber optic sensor 711 includes an optical fiber 702 including a core 704 and a cladding 706, as is well known to those of ordinary skill in the art. The core 704 defines a light path 700. Here, the optical fiber 702 is covered, at least partially, with a tubing 713 that is constituted/configured to react with at least one of a chemical to which the distributed fiber optic sensor 711 is exposed, radiation ($\alpha$, $\beta$, $\gamma$, or neutron) to which the distributed fiber optic sensor 711 is exposed, and a temperature change to which the distributed fiber optic sensor 711 is exposed as disclosed in the description of FIG. 6 above.

Further, the distributed fiber optic sensor 711 includes a coating 712 that is constituted/configured to react with at least one of a chemical to which the distributed fiber optic sensor 711 is exposed (a reactive coating) and radiation ($\alpha$, $\beta$, $\gamma$, or neutron) to which the distributed fiber optic sensor 711 is exposed (a responsive coating), reacting endothermically or exothermically with the specific chemical target(s) and/or heating and/or scintillating and injecting photons into the optical fiber 302 due to exposure to radiation, as disclosed in the descriptions of FIGS. 2 and 3 above.

The detection device 714 coupled to the optical fiber 702 is configured to capture and analyze the Rayleigh scattered light to detect any changes thereto. In particular, the detection device 714 is configured to detect changes in the Rayleigh scattered light caused by the change in radial size of the tubing 713 as discussed above, and/or the temperature changes resulting from one of the endothermic or exothermic reaction caused by exposure to the target chemical or the heating and/or scintillating and injecting of photons caused by exposure to the radiation.

The tubing 713 may be in direct or indirect contact with the optical fiber 702, and in some embodiments, is an outer layer of the optical fiber 702. The coating 712 may be positioned radially inward or radially outward from the tubing 713 and may be in direct contact, indirect contact, or spaced apart from the tubing 713. Again, different distributed optical fiber sensors 711 can be bundled to detect multiple chemical species, radiation types, various temperature changes, and the like. Further, as previously described, layered or hybrid coatings may be used.

Various combinations of the tubing 713 and the coating 712 are contemplated. For example, in one embodiment, the coating 712 is a reactive coating constituted/configured to endothermically or exothermically react with a chemical, while the tubing 713 is constituted/configured to react, by changing in a radial size, with radiation. In embodiments, the material of the coating 712 is selected that will not interfere with the radiation that the tubing 713 is constituted/configured to react with. Thereby allowing for monitoring for two distinct issues at a single position along the optical fiber 702. In another embodiment, the coating 712 is constituted/configured to react with one of a chemical and radiation that results in a temperature change at the coating, while the tubing 713 is constituted/configured to react, by changing a radial size, due to a temperature change therein. As both the temperature change in the coating 712 and the change in radial size of the tubing 713 will affect the Rayleigh scattered light, the combination of the coating 712 and the tubing 713 increases a sensitivity for detecting the chemical/radiation. In a further embodiment, both the coating 712 and the tubing 713 are constituted/configured to respond to either the same type of radiation (for an increased sensitivity to the radiation to be detected) or to different types of radiation. Other combinations of coating 712 and tubing 713 are also contemplated.

Figure 8:
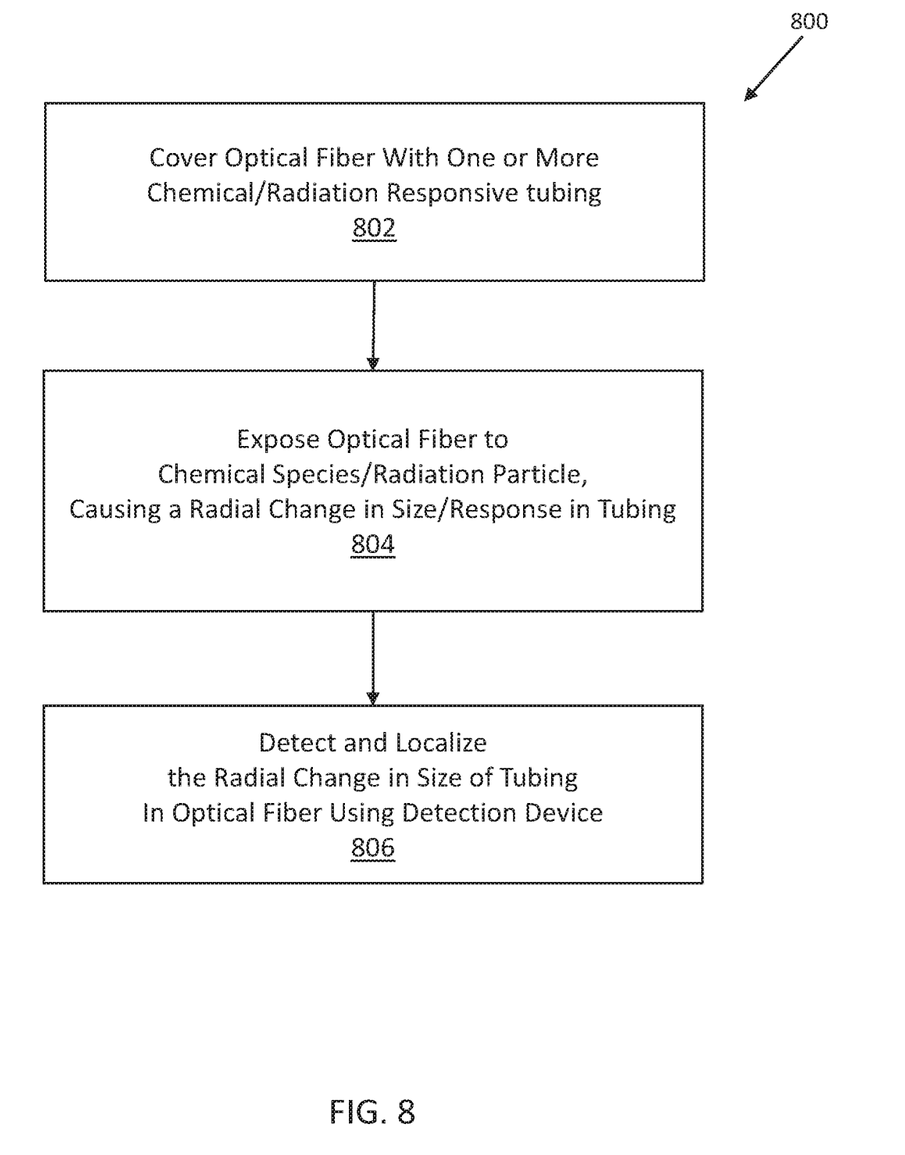
FIG. 8 is a flowchart illustrating one illustrative embodiment of the method for manufacturing and using the distributed fiber optic sensors of the present disclosure.

FIG. 8 is a flowchart illustrating one illustrative embodiment of the method 800 for manufacturing and using the distributed fiber optic sensors of the present disclosure. The method 800 includes, first covering the optical fiber with the one or more chemical/radiation responsive tubing 802. Next, the method 800 includes exposing the optical fiber to one or more chemical species/radiation particles, causing a radial change in size in the tubing 804. Finally, the method 500 includes detecting and localizing the radial change in size of the tubing in the optical fiber using the detection device 806.

Via the present disclosure, leaks can be detected and identified using optical fiber lines, grids, etc., such as in industrial pipe networks and pipe-in-pipe/bundled pipelines, or in chemical or nuclear USTs or landfills with buried or hidden surfaces. Insertion points for pollutants can be identified. Water intrusion into conduits can be detected, or leakages in facilities for the storage of sensitive materials. The hold-up level along transfer pipes can be mapped. Attacks or interrogation via radiation can be detected. Many other applications can be conceived of as well.

The present disclosure provides Rayleigh backscattering-based fiber optic sensors with the ability to detect, identify, and localize chemical and radiation targets. The coatings used are applied directly to telecommunications-quality clad or unclad optical fibers using relatively simple manufacturing methods. Stacked, bundled, or banded coatings can be used to detect both radiative and chemical targets, or multiple targets of either type. Innovative manufacturing techniques may be used, such as embedding reactive/responsive materials into heat-shrinkable claddings, for example. Thus, the coatings of the present disclosure transform a distributed fiber optic sensor into a distributed chemical or radiation sensor that can be applied to any target for which a reaction/response material can be identified. Target chemicals can be in pure form, or diluted in a solvent, for example.

Again, one potential application of the present disclosure is leak detection from USTs that have come to the same temperature as their surroundings. A UST is defined by the Environmental Protection Agency (EPA) as a container (or "tank"), along with associated piping, which has at least 10 percent of its combined volume underground. The EPA regulates USTs storing petroleum, petroleum mixed with biofuels, or certain other hazardous substances. Each of these vessels presents a danger of accidental release that may lead to contamination of groundwater or other health and environmental risks like fire or explosion. As of March 2019, the UST program included approximately 548,000 petroleum containers and 3,500 hazardous material containers, at about 200,000 sites, and there have been nearly 546,000 confirmed releases. The EPA mandates that all UST owners and operators check for accidental releases at least once every 30 days. Additional leak detection applications might include: chemical or nuclear storage containers not subject to EPA monitoring, especially ones with buried or hidden surfaces; chemical leak identification in a mixed storage facility (using multiple fibers with different coatings); hazardous waste landfills; concrete or geopolymer structures for containment of used nuclear fuel and nuclear waste; and water intrusion into conduits or facilities for storage of sensitive media, items, or documents.

As used in this disclosure, to describe the location of the reactive or responsive coating relative to the optical fiber, the term "adjacent" means that the reactive or responsive coating must be within sufficient thermal or optical proximity to the optical fiber to cause the optical fiber to sense the thermal or optical condition, to sense the change in radial size in tubing, and provide a discernable signal when appropriate. Because the reactive or responsive coating or tubing may be, but is not required to be, in direct contact with the optical fiber, this flexibility may be particularly beneficial when applying the coatings of this disclosure in the field to an already-positioned fiber optic cable by spraying or other methods. Thus, the reactive or responsive coating or tubing may be disposed directly adjacent to the optical fiber in a manufacturing environment or indirectly adjacent to the optical fiber in the field, for example. One could go into the filed, dig up the existing fiber only near the surveillance area, and put a tube around a desired short (e.g., 2-foot) section.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A distributed fiber optic sensor device, comprising:
   an optical fiber;
   tubing disposed adjacent to a surface of the optical fiber, wherein, when used, the tubing is formulated or configured to, responsive to exposure to one of a target chemical species and a target radiation particle, change in a radial size and generate a localized effect on or in the optical fiber due to the change in the radial size; and
   one or more of a reactive coating and a responsive coating disposed adjacent to a surface of one of the optical fiber and the tubing, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber.

2. The distributed fiber optic sensor device of claim 1, further comprising a detection device coupled to the optical fiber operable for detecting and localizing one or more of the localized effect generated by the tubing on or in the optical fiber.

3. The distributed fiber optic sensor device of claim 1, wherein the optical fiber comprises a core.

4. The distributed fiber optic sensor device of claim 1, wherein the optical fiber comprises a cladding.

5. The distributed fiber optic sensor device of claim 4, wherein the tubing forms all or a portion of the cladding.

6. The distributed fiber optic sensor device of claim 1, wherein, when used, the tubing comprises a material that is responsive to a constituent of petroleum.

7. The distributed fiber optic sensor device of claim 1, wherein the one or more of the reactive coating and the responsive coating comprises a plurality of adjacent regions that are reactive or responsive to a plurality of different chemical species or radiation particles.

8. The distributed fiber optic sensor device of claim 1, wherein the tubing comprises a plurality of adjacent regions that are responsive to a plurality of different chemical species or radiation particles.

9. The distributed fiber optic sensor device of claim 1, wherein the tubing is adapted to change in the radial size and generate the localized effect on or in the optical fiber by radially constricting.

10. A distributed fiber optic sensor assembly comprising a plurality of distributed fiber optic sensor devices of claim 1 disposed adjacent to each other.

11. A distributed fiber optic sensor method, comprising:
    providing an optical fiber;
    disposing tubing adjacent to a surface of the optical fiber, wherein, when used, the tubing is formulated or configured to, responsive to exposure to one of a target chemical species and a target radiation particle, change in a radial size and generate a localized effect on or in the optical fiber due to the change in the radial size; and
    disposing one or more of a reactive coating and a responsive coating adjacent to a surface of one of the optical fiber and the tubing, wherein, when used, the reactive coating is formulated or configured to react with a target chemical species and generate a localized thermal effect on or in the optical fiber and, when used, the responsive coating is formulated or configured to respond to a target radiation particle and generate a localized thermal or photonic effect on or in the optical fiber.

12. The distributed fiber optic sensor method of claim 11, further comprising coupling a detection device to the optical fiber operable for detecting and localizing one or more of the localized effect generated by the tubing on or in the optical fiber.

13. The distributed fiber optic sensor method of claim 11, wherein the optical fiber comprises a core.

14. The distributed fiber optic sensor method of claim 11, wherein the optical fiber comprises a cladding.

15. The distributed fiber optic sensor method of claim 14, wherein the tubing forms all or a portion of the cladding.

16. The distributed fiber optic sensor method of claim 11, wherein, when used, the tubing comprises a material that is reactive to a constituent of petroleum.

17. The distributed fiber optic sensor method of claim 11, wherein the one or more of the reactive coating and the responsive coating comprises a plurality of adjacent regions that are reactive or responsive to a plurality of different chemical species or radiation particles.

18. The distributed fiber optic sensor method of claim 11, wherein the tubing comprises a plurality of adjacent regions that are responsive to a plurality of different chemical species or radiation particles.

* * * * *